(12) United States Patent
Feibleman

(10) Patent No.: US 10,598,283 B2
(45) Date of Patent: Mar. 24, 2020

(54) EXTRUSION SEAL DEVICES AND METHODS

(71) Applicant: Dorothy Feibleman, Tokoname (JP)

(72) Inventor: Dorothy Feibleman, Tokoname (JP)

( * ) Notice: Subject to any disclaimer, the term of this patent is extended or adjusted under 35 U.S.C. 154(b) by 679 days.

(21) Appl. No.: 15/079,088

(22) Filed: Mar. 24, 2016

(65) Prior Publication Data

US 2016/0279825 A1  Sep. 29, 2016

Related U.S. Application Data

(60) Provisional application No. 62/137,555, filed on Mar. 24, 2015.

(51) Int. Cl.
*F16J 9/12*  (2006.01)
*B28B 3/24*  (2006.01)

(52) U.S. Cl.
CPC .. *F16J 9/12* (2013.01); *B28B 3/24* (2013.01)

(58) Field of Classification Search
CPC ...................................... B28B 3/24; F16J 9/14
USPC .......................................................... 425/461
See application file for complete search history.

(56) References Cited

U.S. PATENT DOCUMENTS

| | | | | |
|---|---|---|---|---|
| 1,948,982 A * | 2/1934 | Cutter | ............... | A61M 5/31513 604/222 |
| 3,318,202 A * | 5/1967 | Means | ................. | F16J 15/3204 92/245 |
| 3,517,097 A * | 6/1970 | Cerny | ..................... | B29C 33/04 264/177.18 |
| 6,319,532 B1 * | 11/2001 | Pineault | .................... | A23G 9/28 222/386 |
| 7,811,074 B2 * | 10/2010 | Schnee | ................ | A21C 15/005 425/183 |
| 9,765,800 B2 * | 9/2017 | Fukui | ........................ | F16J 1/008 |
| 2002/0022108 A1 * | 2/2002 | Krantz | ............... | A44B 18/0049 428/100 |
| 2013/0130026 A1 * | 5/2013 | Heikkila | ................... | H01F 1/01 428/343 |
| 2016/0114518 A1 * | 4/2016 | Zaleski, Jr. | ............. | B29C 48/30 425/376.1 |

OTHER PUBLICATIONS

"AMACO Brent Clay Extruder" (<https://www.sheffield-pottery.com/Amaco-Brent-Clay-Extruder-HD-p/abcehd.html>, Available 2015) (Year: 2015).*

Dorothy Feibleman's Nerikomi Magic Part 2 <https://www.youtube.com/watch?v=j5ZZEDxHgw8> (Year: 2012).*

(Continued)

*Primary Examiner* — Matthew J Daniels
*Assistant Examiner* — Hana C Page
(74) *Attorney, Agent, or Firm* — Reichel Stohry Dean LLP; Natalie J. Dean

(57) ABSTRACT

One aspect of the present disclosure relates to devices for sealing gaps in an extrusion assembly to provide for a consistent extrusion. In one embodiment, a barrel-shaped sealing device with a resilient protruding edge is used to prevent extrusion material from entering gaps between the piston and the inner surface of the barrel. The sealing device includes a fastener to releasably attach the sealing device to the piston. Sealing rings are inserted into a bottom gap formed between the bottom edge of the barrel and the bottom surface of the die.

10 Claims, 7 Drawing Sheets

(56) References Cited

OTHER PUBLICATIONS

Dorothy Feibleman's Nerikomi Work. <http://dorothyfeibleman.blogspot.com/2012/11/porcelain-nerikomi-and-nerikomi-magic.html> (Year: 2012).*

"Glynnis Lessing." <http://www.glynnislessing.com/blog/?p=320> Available Aug. 16, 2009 (Year: 2009).*

* cited by examiner

EXTRUSION SEAL DEVICES AND METHODS

CROSS-REFERENCE TO RELATED APPLICATIONS

The present application claims the priority benefit of U.S. Provisional Patent Application Ser. No. 62/137,555, filed Mar. 24, 2015, the contents of which are hereby incorporated by reference in its entirety into this disclosure.

FIELD OF THE INVENTION

The present disclosure broadly concerns extrusion devices. More particularly, the present disclosure relates to arrangements for use within an extruder to improve performance.

BACKGROUND OF THE INVENTION

Extruders are useful tools for forming a variety of artwork and sculptures, including clay-based artwork and products. When operated correctly, an extruder should form an extruded product (i.e., an extrusion) with a substantially constant cross-section. However, due to variations in shape between separate pieces in a clay extruder, gaps can form that interrupt the consistency of the cross-section of an extrusion. Small gaps may exist between the barrel and the piston when the shape of the piston does not match exactly with the inner surface of the barrel extruder, thereby allowing clay to "leak-back" behind the piston during extrusion. Small gaps may also exist between the end of the barrel and an attached die. Clay may also exit through these gaps as the clay is being extruded, creating an inconsistent extrusion. Typically, when uniform clay is utilized, some degree of inconsistency can be tolerated; however, in more sophisticated arts, a uniform extrusion is essential as the material placed into the extruder is strategically constructed from many different types/colors of clay, and therefore conventional extruders are unacceptable for use in such techniques. Therefore, it is desirable to have a device that seals the various gaps that are present in the barrel of an extruder to produce as consistent a cross-section of material as possible for an extrusion. Accordingly, there remains a need for further contributions in this area of technology.

SUMMARY OF THE INVENTION

The present disclosure includes certain embodiments, for operating in conjunction with an extrusion assembly that include a sealing device and/or one or more sealing rings for use in closing gaps which typically exist in the barrel of an extrusion assembly and extend the inner surface of the barrel all the way to the die.

One representative extrusion assembly is a barrel type extrusion assembly, such as those which are commonly mounted to a Wall for use in clay extrusion. The extrusion assembly includes a clutch system that may slide on a bar. A piston lever is attached to the extrusion assembly so that applying force upward or downward on the lever causes the clutch system and lever to slide along the bar. A piston assembly is connected to the piston lever so movement of the lever also causes the piston assembly to move. Alternately, a screw type piston or a powered piston may be utilized.

The extrusion assembly also includes a barrel with an opening in the top of the barrel into which extrudable material may be inserted. A base cap is attached to the bottom of the barrel. The base cap has an opening that accepts a die through which the extrudable material is pushed. The die has an opening designed to achieve the desired shape. The piston assembly may be inserted in the opening at the top of the barrel after the extrudable material and the die have been inserted. A user operates the extrusion assembly by pushing downward on the piston lever, so that the piston assembly slides downward through the barrel and pushes the extrudable material through the die mounted within the base cap.

Gaps may form in several areas of the barrel that affect the consistency of the extrusion when extrudable material is undesirably forced through these gaps. One of these gaps may exist between the inner surface of the barrel and the piston if the piston has a smaller diameter than the inner diameter of the barrel. Another gap may form between the bottom surface of the barrel and the bottom surface of the base cap.

In one form, a barrel seal with a resilient protruding edge may be inserted between the piston and the extrudable material. The protruding edge has a diameter equal to or just greater than the inner diameter of the barrel so that no gap exists between the barrel seal and the barrel. This protruding edge prevents extrudable material from entering a gap between the piston and the barrel.

Sealing rings may be inserted into the gap between the bottom surface of the barrel and the corresponding surface of the base cap. Multiple rings may be stacked on top of each other to fill the entire gap. The rings have roughly the same diameter as the barrel and are held in place by compression force between the barrel and the base cap.

In another embodiment, the barrel seal may be used after a completed extrusion cycle to clean the interior of the barrel by removing any remaining material after an extrusion cycle. The user removes the base cap from the barrel and clears the barrel of any loose extrudable material. The barrel seal is then inserted into the opening at the top of the barrel and the piston assembly is used to push the barrel seal through the length of the barrel. The protruding edge of the barrel scrapes the inner surface of the barrel and removes any excess extrudable material that is stuck on the barrel.

Further objects, features and advantages of the present disclosure will become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

DETAILED DESCRIPTION

Figure 1:
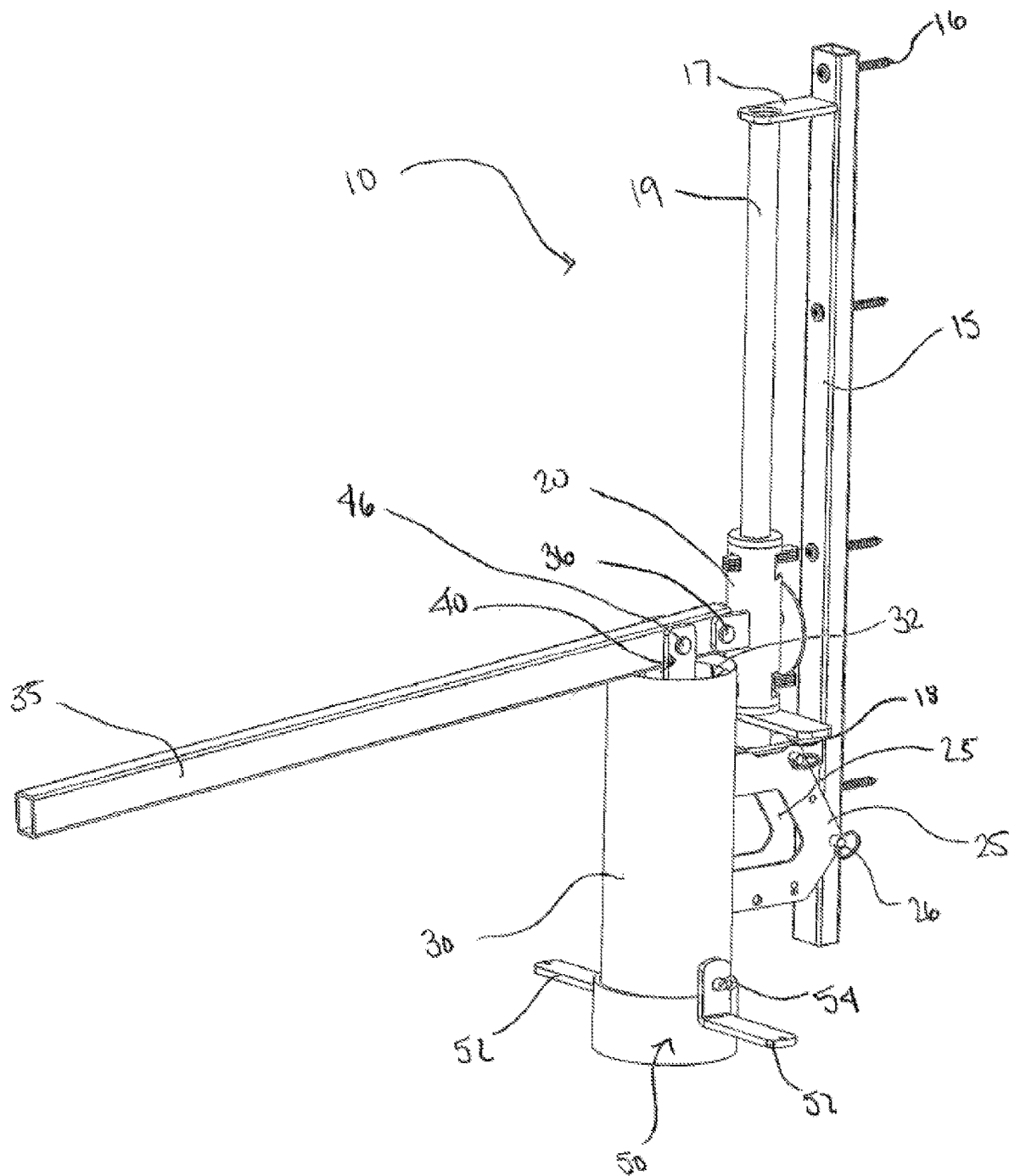
FIG. 1 is a perspective view of an extrusion assembly according to exemplary embodiments of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

The present disclosure relates generally to devices for achieving a consistent extrusion using a conventional extrusion device and for sealing and cleaning the extruder device. The devices of the disclosure enable a consistent extrusion of material and include ring seals and a device for applying uniform pressure on the material and for removing excess material from the extruder after use.

One form of art for which the described devices are necessary for use with certain clay extruders is called Nerikomi. Nerikomi is a traditional Japanese technique for creating ceramic pottery with multiple colored clays. Historically, Nerikomi was performed by hand using slabs of different clays or clays colored with stains or oxides, are stacked, folded, pressed into logs. Slices of the log are then shaped into the desired piece, such as a vessel or plate. In this way, the numerous stacked layers appear as fine undulating lines embedded in a surrounding color in the finished article.

One variation of Nerikomi similarly utilizes slabs (or loads) of different clays or clays colored with stains or oxides, which are strategically stacked, folded, pressed into shape so as to achieve a desired pattern or result when the load is extruded through an extruded. The resulting extruded materials are then formed into the desired shape, such as by using a potter's wheel, or the like. In this variant of Nerikomi, a smooth and consistent extrusion is critical as any variations in the fluid dynamics of the clay will result in undesirable variations in the pattern of colors present in the extruded material. To achieve a consistent and predictable extrusion, any gaps between the components of the extruder that allow material to leak from the extruder must be eliminated. Nerikomi or clay which has structural images (such as millefiori) in the extrusion has not been accomplished before using ceramic clay and a conventional extruder to the knowledge of the inventor. The devices and methods of the present disclosure enable a user to achieve the desired consistent and predictable extrusion using a conventional extruder.

FIG. 1 shows an embodiment of a conventional extrusion assembly 10. Extrusion assembly 10 may include an extruder mount 15, a clutch system 20, barrel supports 25, a barrel 30, a piston lever 35, a piston system 40 and a base cap 50. The extrusion assembly 10 shown in FIG. 1 is merely an exemplary extruder. Alternative embodiments of extrusion assemblies may have different sizes, shapes, assemblies for mounting and different methods of moving the piston system within the barrel.

Extruder mount 15 attaches extrusion assembly 10 to a surface, such as a wall, with screws 16. A top bar support 17 and a bottom bar support 18 extend from extruder mount 15. A shaft 19 extends between top bar support 17 and bottom bar support 18. Barrel supports 25 are attached to and extend from a lower portion of extruder mount IS. Barrel supports 25 are connected by a pin 26 that is inserted through a hole in one barrel support 25 and extends through an opening in wall mount 25 and through a hole in the opposite barrel support 25.

A clutch system 20 is attached to shaft 19 so that the clutch system 20 may slide along the length of shaft 19. A piston lever 35 is attached to clutch system 20 and extends away from of extruder mount 15. Piston lever 35 is attached to clutch system 20 at a pin 36, allowing a user to slide clutch system 20 along shaft 19 by applying force upward or downward on piston lever 35. A piston system 40 is attached to piston lever 35 near pin 36 so that it moves with piston lever 35 when force is applied by the user. As shown in FIG. 1, when clutch system 20 is in its lowest position along shaft 19, piston system 40 is fully within barrel 30. Barrel 30 is connected to wall mount 15 by barrel supports 25. In at least one embodiment, barrel 30 is shaped as a hollow cylindrical tube. A barrel opening 32 located at the top of barrel 30 allows access to the interior of barrel 30.

Figure 2:
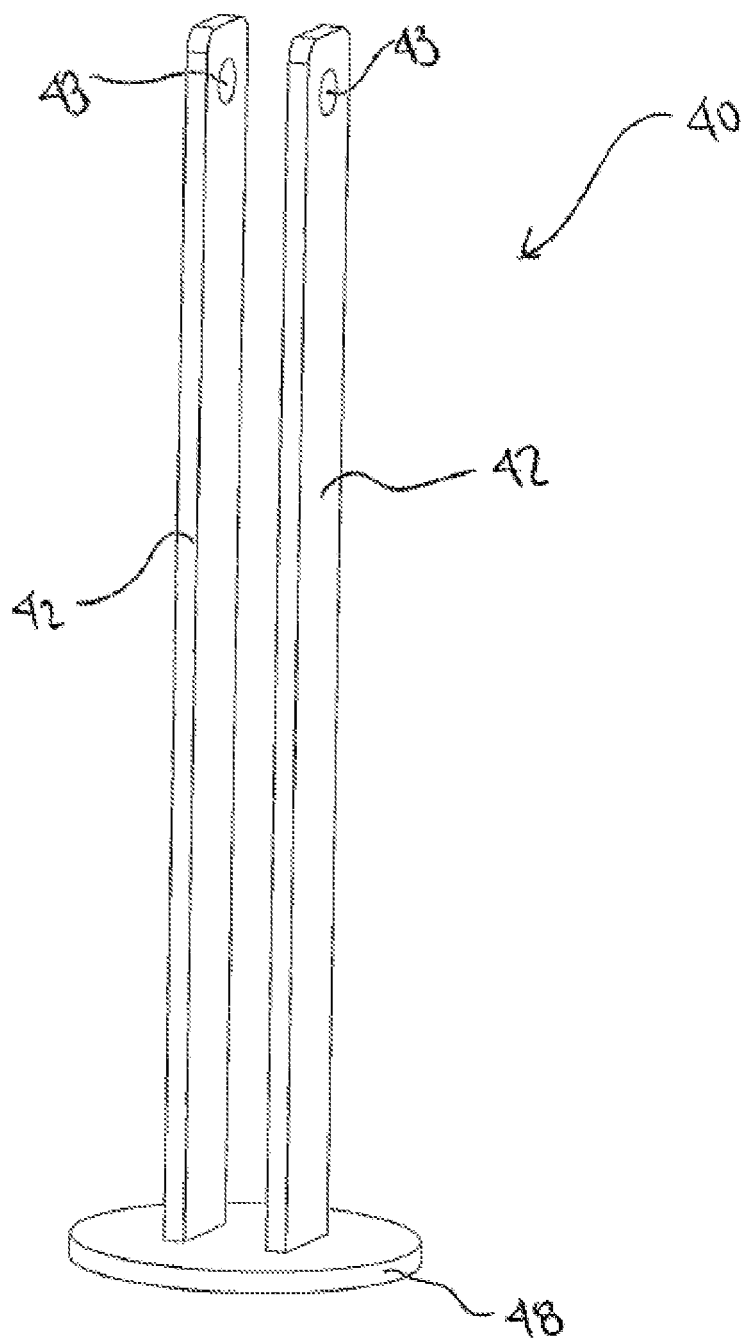
FIG. 2 is a perspective view of the piston assembly from the extrusion assembly of FIG. 1 according to exemplary embodiments of the present disclosure.

As seen in FIG. 2, piston system 40 may include a pair of piston arms 42. Arm openings 43 are positioned near the upper end of piston arms 42. Piston arms 42 may be attached to piston lever 35 using a pin 46. To attach arms 42 to lever 35, piston system 40 is positioned so that lever 35 is between pistons arms 43. Pin 46 may be disposed through one of the arm openings 43, through an opening in lever 35, and then through the second arm opening 43. A piston disk 48 may be attached to the bottom end of piston arms 42. Piston system 40 may be removed from barrel 30 by pulling upward on piston lever 35 and causing clutch system 20 to slide upward on shaft 19. If clutch system 20 is slid far enough on shaft 19, piston system 40 including the piston disk 48 may be removed from barrel 30, enabling access to barrel 30 through an upper barrel opening 32.

Figure 3:
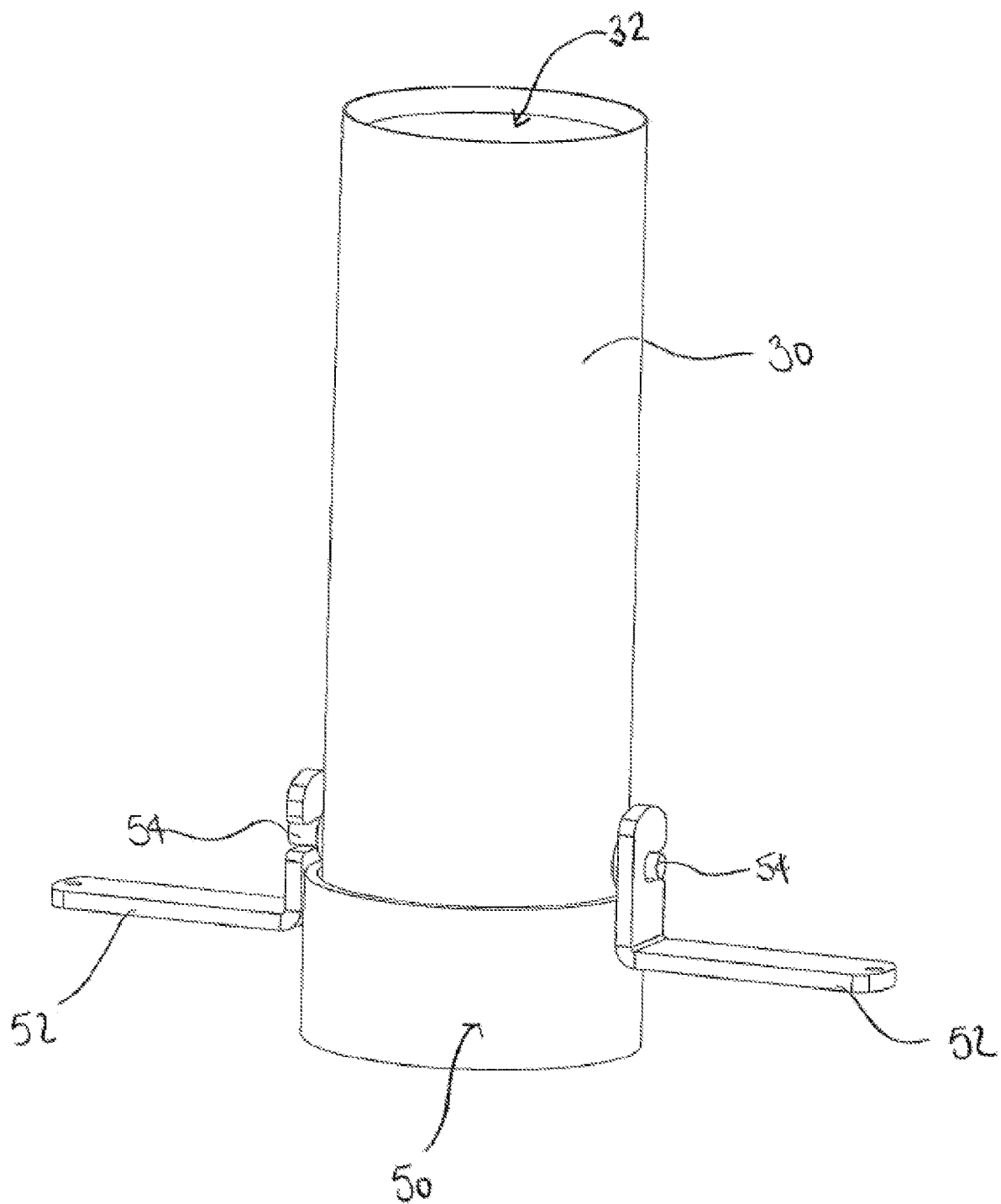
FIG. 3 is a perspective view of the barrel and base cap from the extrusion assembly of FIG. 1 according to exemplary embodiments of the present disclosure.
Figure 4:
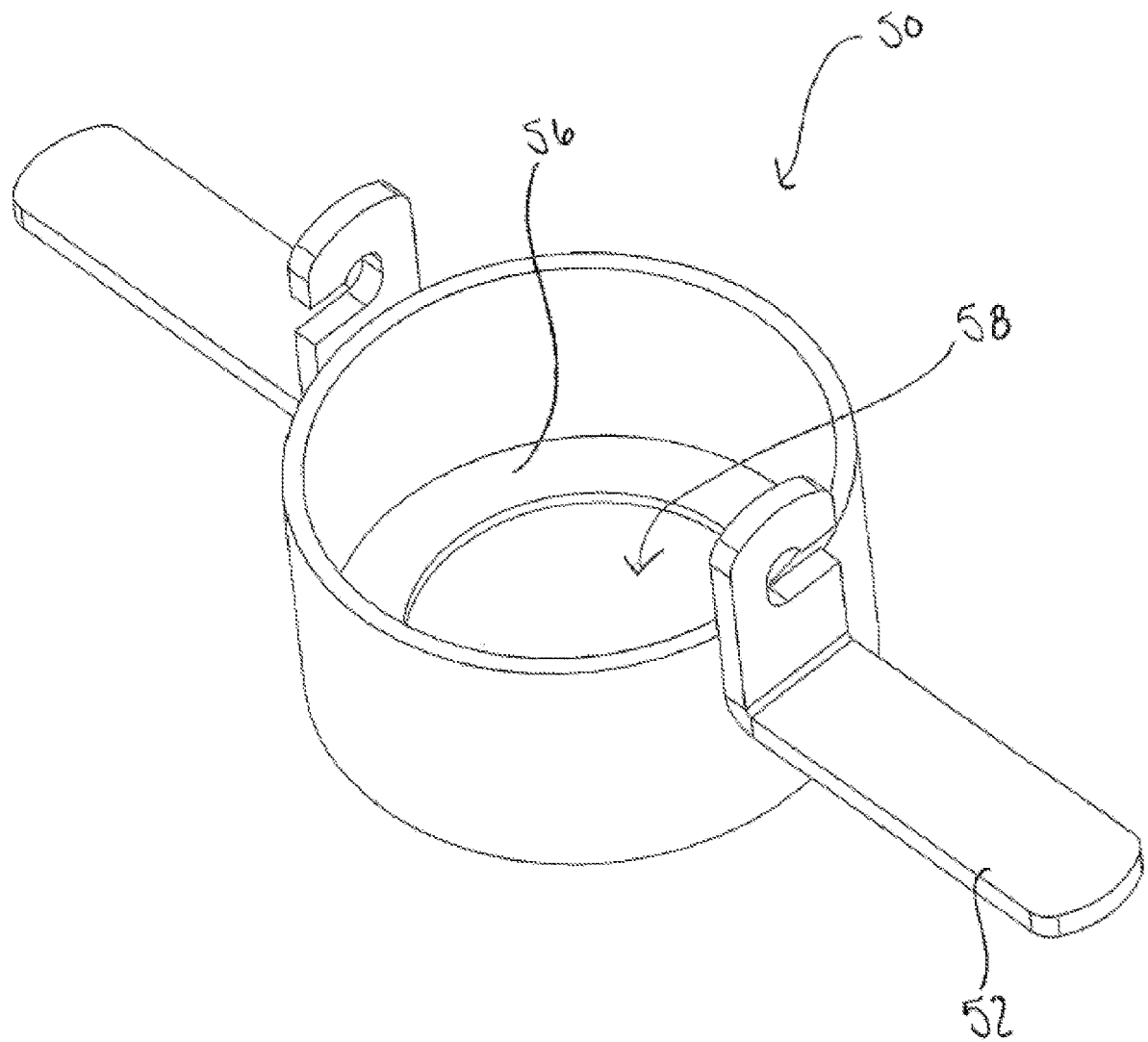
FIG. 4 is a perspective view of the base cap from the extrusion assembly of FIG. 1 according to exemplary embodiments of the present disclosure.

As shown in FIG. 3, a base cap 50 may be reversibly attached to the bottom of barrel 30. As shown in FIG. 4, the base cap 50 may include one or more base cap handles 52 positioned on opposing sides of base cap 50, which further includes notches configured to engage pins 54 located on barrel 30 (shown in FIG. 3), enabling easy installation and removal of base cap 50 from the bottom of barrel 30. An opening 58 in the bottom surface 56 of base cap 50 accepts a die (not shown) through which the extrudable material may be pushed by the piston system 40. The die maybe a conventional tool die and may include at least one opening of a desired shape, depending on the desired shape and size of the extrusion. For example, the die may have an opening in the shape of a triangle to create an extrusion with a triangular cross-section or in the shape of a square to create an extrusion with a square cross-section.

Figure 5:
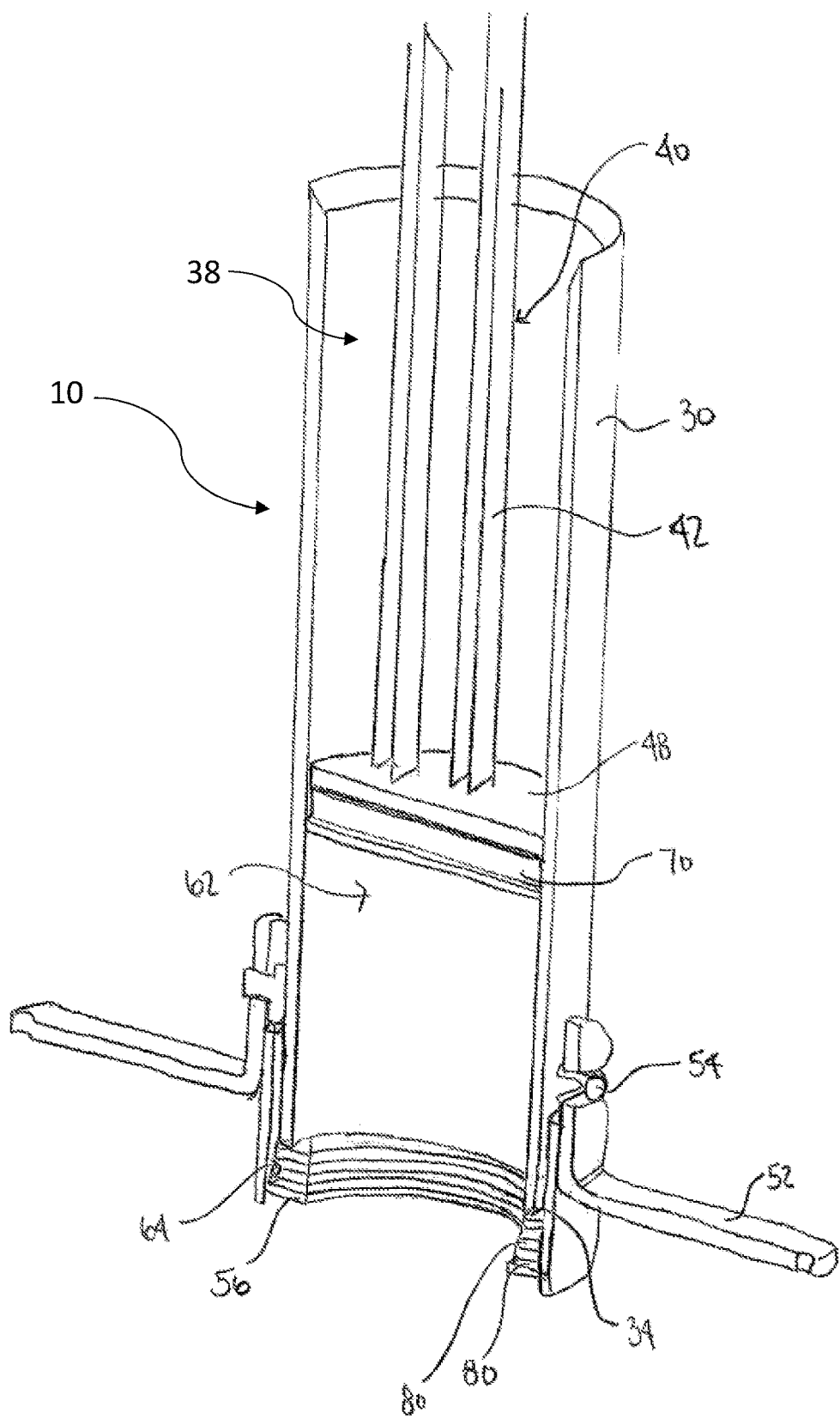
FIG. 5 is a cross-section view of the extrusion assembly from FIG. 1 according to exemplary embodiments of the present disclosure.

FIG. 5 illustrates a cross-section of extrusion assembly 10, including the piston system 40 inserted within barrel 30. As shown in FIG. 5, the barrel 30 includes an inner surface 38 defining a volume with the barrel 30. When piston system 40 is inserted into barrel 30, a variable volume 62 is created between inner surface 38, piston disk 48 and the bottom portion 56 of base cap 50. In operation, extrudable material, such as clay, is positioned in volume 62 and is pushed through base cap opening 58 as the material is forced downward by movement of piston system 40 caused by the user.

Figure 6:
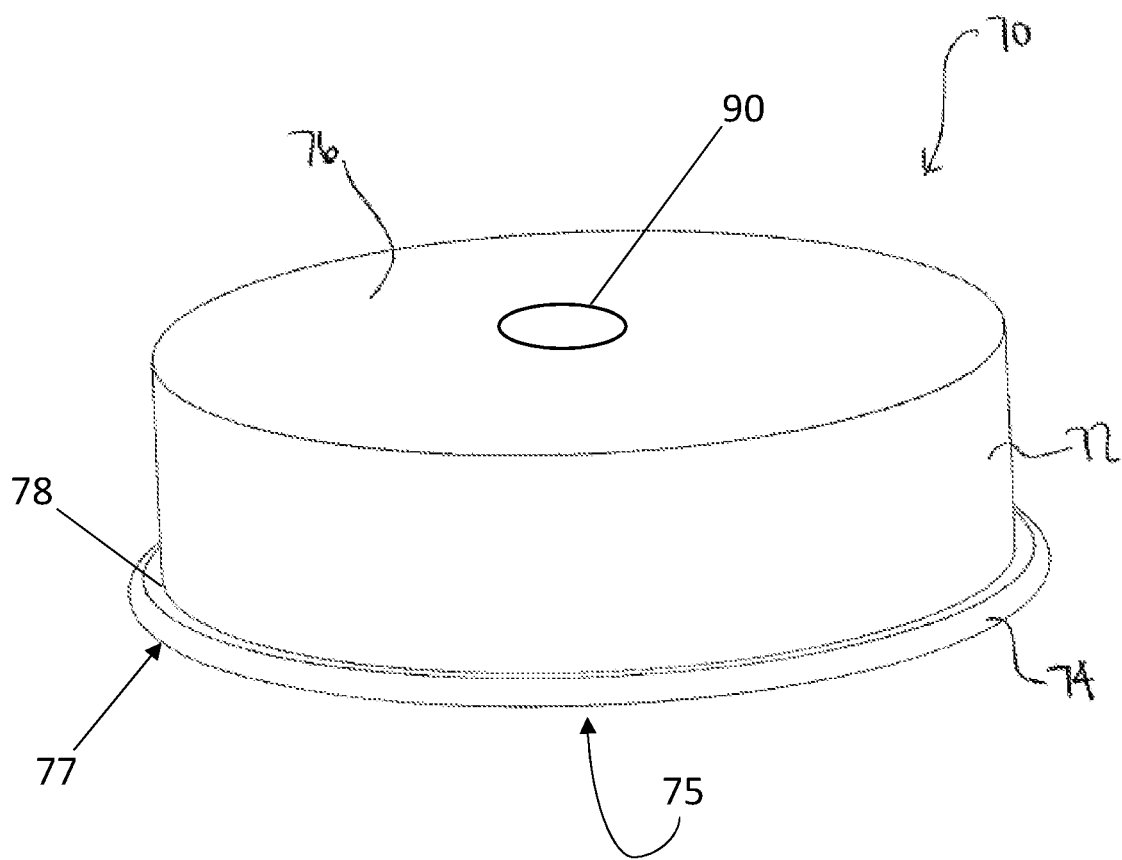
FIG. 6 is a perspective view of a barrel seal according to exemplary embodiments of the present disclosure.

In at least one embodiment according to the present disclosure, a barrel seal 70 is positioned between the extrusion material and the piston disk 48. In such an embodiment, barrel seal 70 is structured with a shape and size that is approximately equal to the internal shape and size of barrel 30. As one example, where the barrel 30 has a cylindrical shape with a circular cross-section, an embodiment of the barrel seal 70 may have a round, generally puck-shaped, profile with a diameter that is approximately equal to the inner diameter of barrel 30. In such an embodiment, as shown in FIG. 6, barrel seal 70 includes a body 72 having a top surface 76 and an axially opposing bottom surface 78. In operation, barrel seal 70 is inserted into barrel 30 so top surface 76 of barrel seal 70 contacts piston disk 48 and bottom surface 75 rests on the extrudable material residing in the volume 62. In alternative embodiments, the barrel 30 may have non-circular cross-section, and the barrel seal 70 has a complementary, non-circular, shape.

Barrel seal 70 further includes a lip 74 extending radially from the body 72 at or near the bottom surface 78. In at least one embodiment, the lip 74 may comprise a disk of larger diameter than the body 72 that is affixed to the bottom surface 78 of the body 72. The lip 74 includes a perimeter 77 having a size and shape structured to complement the inner surface 38. For example, where the barrel 30 has a cylindrical cross-section, an embodiment of the lip 74 may have diameter defined by the perimeter 77 approximately equal to or slightly smaller than the diameter of the barrel 30 defined by the inner surface 38. Lip 74 is structured to contact the inner surface 38 of barrel 30 to seal any gap that may exist or potentially develop between piston disk 48 and barrel 30. The lip 74 enables a consistent and predictable pressure and flow fluid to be created within volume 62 and the material contained therein during extrusion. The perimeter 77 of the lip 74 may include a radius to facilitate movement of the barrel seal 70 along the inner surface 38 when downward force is applied via the piston system 40. In at least one embodiment, the radius of the perimeter 77 may be about 0.063 inches (in.).

The body 72 of barrel seal 70 may be made of a semi-rigid or rigid (i.e., firm) material capable of efficiently transferring force from the piston system 40 to the extrudable material. In one embodiment, body 72 may have a diameter of around 3.8 in. and a height of about 0.875 in. In such an embodiment, the barrel seal may have an overall height, including the body 72 and the lip 74, of around 1.125 in. The lip 74 may be made from a resilient material extending radially from body 72 around its circumference. The lip 74 may further be made of a non-sticky material that does not readily stick to the extrudable material. In certain embodiments, the lip 74 and the bottom surface 75 of the body 72 may include a non-stick coating that does not readily stick to the extrudable material. In certain embodiments, the seal barrel 70 may be fabricated by co-molding the lip 74 onto the body 72 in an injection molding process.

The lip 74 may extend from the body 72 by a distance that is large enough to enable the lip 74 to flex as the barrel seal 70 is pushed along the barrel 30. The lip 74 may extend from the body 72 by a distance that is limited to prevent the lip 74 from flexing too much as the barrel seal 70 is pushed along the barrel 30 such that material may leak passed the lip 74. In certain embodiments, the lip 74 may extend between about 0.1 and 0.5 in. from the body 72. In at least one embodiment, the lip 74 may extend about 0.295 in. from the body 72. The barrel seal 70 may further include a filet 78 between the body 12 and the lip 74. The filet 78 enables the lip 74 is reversible distort and flex as described herein without causing the lip 74 to crack or fracture at the interface to the body 72. In at least one embodiment, the filet 78 may be about 0.063 in.

In one aspect, the barrel seal 70 improves the performance of a conventional extruder by preventing the extrudable material from sticking to the piston click 48 and to the inner surface 38 of the barrel 30. With a conventional extruder, as the user attempts to withdrawal the piston system 40 from the barrel 30 after extruding the desired amount of extrudable material, the piston disk 48 may become stuck to the extrudable material due to its generally tacky nature, which can make the piston system 40 very difficult to withdrawal. Moreover, material that has leaked passed the piston disk 48 may further restrict movement of the piston system 40.

In at least one embodiment according to the present disclosure as shown in FIG. 6, the barrel seal 70 may include a fastener 90 disposed on the top surface 76 of the body 72. The fastener 90 is structured to releasably attach to the piston disk 48. The fastener 90 enables the barrel seal 70 to maintain contact with the piston disk 48 of the piston system 40. In certain embodiments, the fastener 90 may maintain contact with the piston disk 48 to a desired force load and then break free, thereby releasing from the piston disk 48. Such a fastener 90 improves operation of a conventional extruder by enabling the piston system 40 to be more easily pushed into the barrel 30 as the slide clutch system 20 ratchets along shaft 19. The fastener 90 may be any suitable releasable fastener, for example a snap button. In at least one embodiment, the fastener 90 may be a magnet that magnetically attaches with limited force to the piston disk 48. In alternative embodiments, the fastener 90 may be a hook and loop fastener, such as is commonly known as Velcro®. In such embodiments, the piston disk 48 may include a mating fastener piece.

Referring to FIG. 5, in at least one embodiment according to the present disclosure, a bottom edge 34 of barrel 30 often does not extend to the bottom surface 56 of base cap 50, resulting in a bottom gap 64. The bottom gap 64 is often due to the frequent need for extruders to accommodate more advances dies, such as those using a spider, to achieve more advanced extrusions, such as hollow shapes. Such an arrangement may cause the material being extruded to be forced into the bottom gap 64 between bottom edge 34 and bottom surface 56, causing an inconsistent extrusion. The extruded material may be prevented from entering bottom gap 64 by using one or more spacer rings 80 to fill bottom gap 64 and effectively extend the barrel 30 down to the die.

Figure 7A:
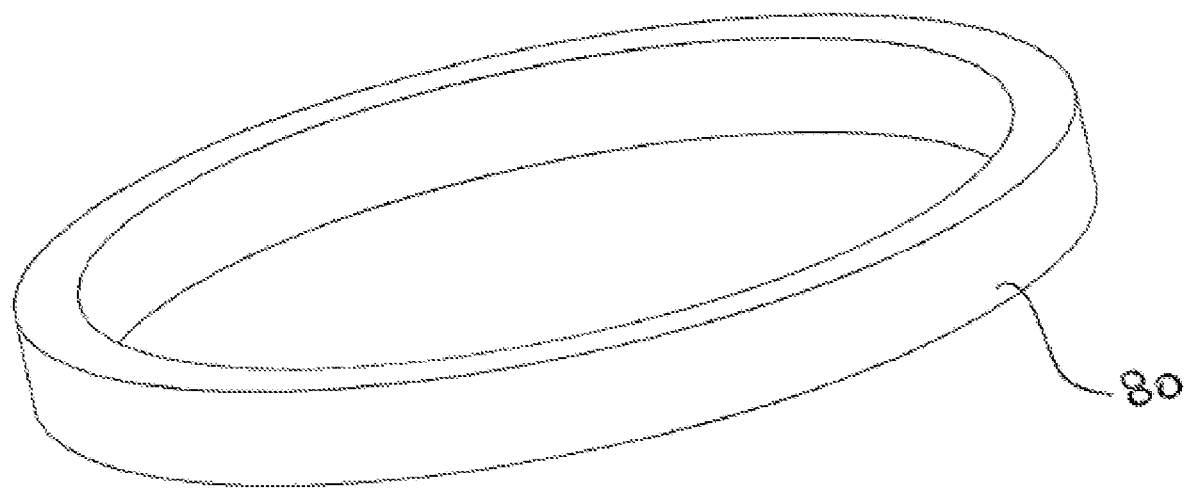
FIG. 7A is a perspective view of a ring seal according to exemplary embodiments of the present disclosure.
Figure 7B:
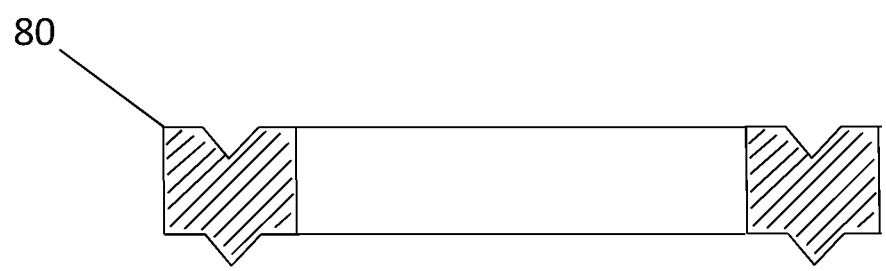
FIG. 7B is a cross-section view of a ring seal according to exemplary embodiments of the present disclosure.

As shown in FIG. 7A, spacer rings 80 are rings that may be made from a rigid or a resilient, compressible material. Spacer rings 80 may be configured to fit within the base cap 50. For example, spacer rings 80 may have the same or similar inner diameter as barrel 30 so as to fit between barrel 30 and bottom surface 56 of base cap 50. Spacer rings 80 may be held in place by the compressive force between barrel 30 and base cap 50. Multiple spacer rings 80 may be used to fill bottom gap 64 by sitting on top of one another to accommodate extruders having varying sized gaps. In certain embodiments, as shown in FIG. 7B, spacer rings 80 may have protrusions or grooves on their axial surfaces that enable multiple spacer rings 80 to be interlocked and securely stacked on each other so as not to slide relative to each other. In certain embodiments, the bottom-most spacer ring 80 adjacent the base cap 50 may include a flat side (i.e., without protrusions or grooves) adjacent the base cap 50 to facilitate sealing there-against.

Base cap 50 may be removed from barrel 30 and a different base cap 50 may be attached to provide a different size or shape extrusion. When a new base cap 50 is added, the number of spacer rings 80 may be increased or decreased to fill the gap between the bottom surface 56 of the base cap 50 and the bottom of barrel 30. In certain embodiments of the extruder assembly 10, there is no bottom gap 64 between the base cap 50 and the bottom edge 34 of barrel 30, and such an embodiment may not include any spacer rings 80.

In operation, the user selects the desired base cap 50 and die to be attached to the base of barrel 30. The combination of the opening 58 and the die in the bottom of base cap 50 determines the shape that the extruded material exiting the extruder assembly 10 once pushed through barrel 30. The user may stack spacer rings 80 on bottom surface 56 of base cap 50 to fill the bottom gap 64 created between the bottom edge 34 of barrel 30 and bottom surface 56. The number of spacer rings 80 that are stacked depends on the size of the bottom gap 64. The number of spacer rings 80 employed should entirely fill bottom gap 64 (see FIG. 5).

The piston system 40 may be initially removed from barrel 30 allowing the user access to volume 62 through upper barrel opening 32. The user inserts an extrudable material, such as clay, into the barrel 30 through upper barrel opening 32. Once the extrudable material has been placed in barrel 30, the user places the barrel seal 70 into barrel 30 such that barrel seal 70 rests on top (i.e., at the back) of the extrudable material. Barrel seal 70 is positioned so protruding edge 74 is located near the extrudable material.

Once spacer rings 80 and base cap 50 have been properly installed and the extrudable material and barrel seal 70 have been inserted into barrel 30, the user positions piston system 40 so piston disk 48 aligns with and contacts top surface 76 of barrel seal 70. The user then applies downward force on piston lever 35, causing piston system 40 to push downward on barrel seal 70 and slide through barrel 30. As piston system 40 and barrel seal 70 move through barrel 30, the extrudable material is forced through the die and extruded from opening 58 of base cap 50. While barrel seal 70 moves through barrel 30, lip 74 contacts the inner surface 38 of barrel 30 such that no gaps exist between seal 70 and barrel 30. If barrel seal 70 were not present, gaps could exist between piston disk 48 and the inner surface 38, causing some of the extrudable material to be pushed through these gaps (i.e., leak-back), which can affect the consistency of the extrusion.

The barrel seal 70, by preventing leak-back, also serves to make the extrusion process easier for the user. By preventing leak-back, the barrel seal 70 prevents material from being trapped above the piston disk 48 and between the piston disk 48 and the inner surface 38. In addition, the surface of the piston disk 48 does not contact the typically sticky surface of the extrudable material and thus can be moved up and down much more freely. In a conventional extrusion process, the piston disk 48 can become stuck, requiring great force to remove from the barrel 30.

The sealing rings 80 act to fill bottom gap 64 between the bottom edge 34 of barrel 30 and bottom surface 56 of base cap 50. Without sealing rings 80, extrudable material may be forced through bottom gap 64 and get lodged between base cap 50 and the outer surface of barrel 30. Bottom gap 64 may also affect the consistency of the extrusion, which may be undesirable for various products for which the extrusion is to be used. With sealing rings 80 in place, the extrudable material cannot enter bottom gap 64 and a more consistent extrusion is achieved.

Barrel seal 70 may also assist in cleaning extrusion assembly 10. To clean barrel 30, the user may remove the base cap 50 and any remaining extrudable material from barrel 30 and insert barrel seal 70 into barrel 30 through opening 32. Piston disk 48 is then positioned on top surface 76 of barrel seal 70, and the user pushes downward on piston lever 35 to force piston disk 48 and barrel seal 70 through barrel 30. As barrel seal 70 moves through barrel 30, lip 74 scrapes excess material from the inner surface 38 of barrel 30.

The barrel seal 70 may further increase the reliability and longevity of the extrusion assembly 10. In a conventional extruder, the piston disk 48 can become bent due to the repeated force applied against an uneven extrudable material of variable hardness. The barrel seal 70 enables the piston disk 48 to consistently seat against a firm surface and uniformly distributes pressure from the piston disk 48 to the extrudable material, thereby prevent excessive unbalanced forces that can wear and damage the piston disk 48.

While various embodiments of the present disclosure have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. An extruder comprising:
    a barrel having a barrel width structured to contain and pass an extrudable material;
    a piston assembly including a handle connected to a piston, the piston structured to fit at least partially within the barrel, wherein the piston assembly enables a user to push the extrudable material through the barrel by applying force to the handle; and
    a seal device disposed within the barrel adjacent to the piston and between the extrudable material and the piston, wherein the seal device comprises:
        a body including a first end and an opposing second end that define a height of the body, a side surface extending between the first end and the second end, and defining a first width of the body, wherein the first end is substantially parallel to the second end, the second end defines a substantially planar surface extending across the first width, and wherein the body comprises a substantially firm material, and
        a lip extending radially from the body at or near the second end to define an edge, the edge defining a second width, wherein the edge has a radius and the second width is greater than the first width, wherein the lip comprises a resilient material, and wherein the body supports the lip enabling the edge of the lip to flex, wherein the second width is nearly the same as the barrel width, and the body is releasably coupled with the piston such that the seal device is released from the piston when sufficient force is applied to the piston in a direction away from the seal device.

2. The extruder of claim 1, the device further comprising a fastener affixed to the first end at or near a centroid defined by the first end, the fastener structured to releasably attach the body of the seal device to the piston and to release the seal device from the piston when the sufficient force is applied to the piston in the direction away from the seal device.

3. The extruder of claim 1, the device further comprising a filet between the body and the lip.

4. The extruder of claim 1, wherein the barrel, the body and the lip have circular cross-sections.

5. The extruder of claim 1, wherein the sufficient force is applied by the handle of the piston system.

6. The extruder of claim 1, the extruder further comprising:
   a cap structured to reversibly attach to an end of the barrel and to secure an extrusion die at the end; and
   at least one spacer ring disposed between the end of the barrel and the cap, wherein the at one spacer ring is structured and sized to fill a gap formed between the end of the barrel and a bottom surface of the cap and prevent extrudable material from leaking into such gap.

7. The extruder of claim 6, wherein the at least one spacer ring includes opposing protrusions and grooves configured to engage one another such that multiple spacer rings are aligned when stacked one to another with the protrusion of one spacer ring engaging the groove of an adjacent spacer ring.

8. A method of extruding material comprising:
   providing an extruder, the extruder comprising:
      a barrel having a barrel width structured to contain and pass an extrudable material;
      a piston assembly including a handle connected to a piston, the piston structured to fit at least partially within the barrel, wherein the piston assembly enables a user to push the extrudable material through the barrel by applying force to the handle; and
      a seal device disposed within the barrel adjacent to the piston and between the extrudable material and the piston, wherein the seal device comprises:
         a body including a first end and an opposing second end that define a height of the body, a side surface extending between the first end and the second end, and defining a first width of the body, wherein the first end is substantially parallel to the second end, the second end defines a substantially planar surface extending across the first width, and wherein the body comprises a substantially firm material, and
         a lip extending radially from the body at or near the second end to define an edge, the edge defining a second width, wherein the edge has a radius and the second width is greater than the first width, wherein the lip comprises a resilient material, and
         wherein the body supports the lip enabling the edge of the lip to flex, wherein the second width is nearly the same as the barrel width, and the body is releasably coupled with the piston such that the seal device is released from the piston when sufficient force is applied to the piston in a direction away from the seal device;
   placing material in a feed end of the barrel of the extruder, wherein the barrel has an extrusion end opposite the feed end;
   placing the seal device in the feed end of the barrel adjacent the material such that the seal device is behind the material relative to the extrusion end;
   placing the piston of the piston system at least partially within the barrel adjacent the seal device such that the piston is behind the seal device relative to the extrusion end; and
   applying a force to the handle to extrude the material from the extrusion end of the barrel through a die disposed at the extrusion end via the seal device via the piston.

9. The method of claim 8, the method further comprising:
   placing one or more spacer rings adjacent the extrusion end of the barrel; and
   attaching a cap to the barrel at or near the extrusion end such that the one or more spacer rings are retained between the extrusion end of the barrel and the cap.

10. The method of claim 9, the method further comprising:
   after applying a force to the handle to extrude the material from the extrusion end of the barrel, removing the cap and the die; and
   applying force to the handle to push remaining material from the barrel.

* * * * *